Dec. 25, 1962  W. HENNING  3,069,741
CLAMPING RING
Filed July 15, 1959
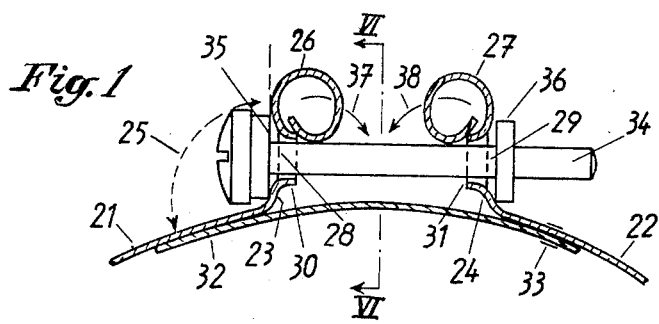
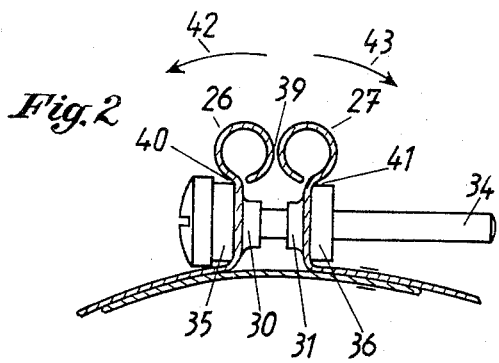
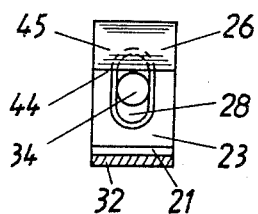
INVENTOR
W. Henning
By Glascock Downing Seebold
ATTYS.

3,069,741
CLAMPING RING
Wolfgang Henning, Dütlingstal, Niedermarsberg,
Westphalia, Germany
Filed July 15, 1959, Ser. No. 827,312
Claims priority, application Germany May 12, 1959
2 Claims. (Cl. 24—279)

In clamping rings, the problem arises of providing, at the point where the clamping screw passes through the ends of the ring, devices which prevent the pressure exerted by the clamping ring on the relatively thin material of the ring band from acting unilaterally.

Numerous proposals have been made with a view to neutralising this unilateral action. Thus, separate clamping jaws have been attached at the points at which the clamping screw is to be attached to the clamping band. A respective transversely extending rib has been provided on each of the mutually opposed surfaces of these clamping jaws, and holes, through which the clamping screw can be inserted, have been made through the tops of these ribs in such a manner that when the clamping screw is tightened the head and the nut can so adjust themselves, in any position, on the top of these ribs by pivotal movement, that disadvantageous effects do not occur even when the clamping screw is tightened hard.

In accordance with another proposal the clamping jaws have been made so thick that one clamping jaw provided with a screw thread and the other clamping jaw provided with a smooth bore, are so guided by the clamping screw that when the clamping screw is tightened a movement of the clamping jaws towards one another is obtained which resembles that of a parallel vise, and the two clamping jaws are attached to the easily flexible clamping band in such a manner that the kinked edges formed between the clamping band and the clamping jaws during tightening act as joints so that the clamping band can easily follow all angular changes between the clamping jaws and the outer surface of the flexible tube.

Clamping rings are also know which have flanges that are bent outwards at an acute angle and are each provided with a bore for accommodating the clamping bolt; each flange has a respective prolongation projecting beyond the bore; each prolongation is folded so as to come into contact with the flange and is provided with a bore opposite the flange bore, and the inner end of each prolongation is bent over at right angles towards the opposite end. In this known construction of the ring, however, during tightening the flanges together with their folded prolongations tend to tilt inwards and thereby exert a braking action on the screw shank. The bent flange prolongations located on the inside between the clamping bolt, on one side, and the surface of the flexible tube to be clamped, on the other side, cannot satisfactorily prevent the undesirable tilting of the flange; also, one bent end bears against the other bent end formed as a slide bar, and as a result, the sliding of the clamping band ends during tightening by means of the tightening screw is hindered and under certain circumstances is actually prevented in the final stage of the tightening process. One bent end may bulge outwards under the action of the expansion forces of the flexible tube, whereby sealing may become imperfect at this bulge. Moreover the other bent end formed as a slide bar cannot slide satisfactorily along the opposite end of the clamping band during tightening, so that defective sealing may arise here too through bulging. In order to prevent this, in accordance with the invention, in a clamping ring having flanges which are each bent outwards at an acute angle and are each provided with a respective bore for accommodating the clamping bolt and with a respective prolongation, the prolongations of the flanges of the clamping ring are bent towards one another in such a manner that at least one of the prolongations bears directly against the clamping bolt from the outside. In one particular form of the invention the prolongations are rolled inwards.

Clamping bands are known which have rolled-in ends. The aforementioned clamping bands are fundamentally different from the present invention in that the rolled-in portions are not each at the end of a clamping band flange bent at an acute angle, and therefore outside the clamping bolt; instead, these rolled-in portions replace the flanges and are therefore provided with bores through which the clamping bolt may be inserted. In order to make this possible, the rolled-in portions have to be provided with bores on two opposite sides, i.e. each of these portions has to be provided with at least two bores. This makes manufacture more expensive, because the two holes in each rolled-in portion have to be made to register exactly with one another to permit the clamping bolt to be inserted through them; also, when the clamping bolt is tightened considerable resistances arise through deformation of the rolled-in portion, and in the region of the clamping bolt thread these resistances may become so large as to have a thread-locking action. In accordance with the invention this is avoided by arranging each rolled-in portion at the outer end of the flange provided with a bore through which the clamping bolt is inserted, so that the clamping bolt itself is not inserted through the rolled-in portion at all.

It is also possible to form the clamping rings so that only one prolongation is rolled in, while the other prolongation is folded back so far as to be in contact with the flange and is bent at right angles at the extreme end.

It is also possible simply to bend both prolongations at right angles so that they are directed towards one another, in such a manner that these bent portions lie one upon the other and both bear against the clamping bolt.

In all of the above-described forms of the clamping band in accordance with the invention, the prolongation of each flange bears against the shank of the clamping bolt on the outside, whereby unilateral pressure exerted by the clamping bolt on the outer end of the respective flange is avoided.

In accordance with the invention the prolongations of the clamping band flanges bear against the clamping bolt from the outside, and this gives rise to the further advantage that during tightening the sharp edge in the upper region of the flange bores does not enter the thread, so that no locking action, which would make it difficult to tighten the clamping screw, takes place; instead, the smooth inwardly rolled end of the prolongation can slide over the thread.

Lastly, by suitably adjusting the dimensions of the clamping ring to those of the body to be clamped it is possible to ensure that during tightening, the sides of the two rolled-in portions which face towards one another come into contact with one another in the final stage, and this causes these sides additionally to bear against one another in a horizontal direction, whereby a particularly uniform transmission of force to the flange is obtained.

In accordance with a further improved form of the invention, the bores in the flanges may be beaded over towards the inside in such a manner as to produce a cylinder-shaped flange of which the internal diameter is so large that the bolt can pass through with clearance inside the beaded portion. The purpose of these beaded portions is to protect the thread of the clamping bolt in case of strong stresses during tightening.

The beaded portions on the one hand, and the rolled-in portions of the flange on the other hand, and the length of the clamping band, are so adjusted relatively to one another that the two rolled-in portions bear on the thread during that part of the tightening process during which the clamping forces are still relatively small. It is only when the tightening forces exceed a certain value that the two rolled-in portions have come so close to one another as to be in contact with one another. This ensures that the pressure forces exerted on the bolt by the rolled-in portions become small, since these pressure forces are not absorbed by the bolt alone, but part of the forces tending to produce tilting and proceeding from the bolt is absorbed by the two rolled-in portions bearing against one another. As tightening continues, these forces exerted on one another by the rolls become greater, until the two rolled-in portions are bent outwards about the upper edge of the washer and of the screw-bolt nut, respectively, and are thereby simultaneously lifted off the the threaded shank.

This process achieves two results. First, exertion of excessive pressure on the threaded shank by the rolled-in portions because of the increasing forces during the tightening of the screw bolt, is prevented; this excessive pressure would cause damage to the thread, and under certain circumstances might actually cause the bolt to bend, which is undesirable. Secondly, the tilting moments which are exerted on the flanges of the clamping ring and which are absorbed, in the initial stage, by the rolled-in portions bearing against the threaded shank, are neutralised by the rolled-in portions being pressed against one another.

The rolled-in portions have to perform yet another function during the first stage of the tightening of the clamping bolt. The rolled-in portions bearing on the clamping bolt from above prevent the edges of the bores in the flanges from being pressed unilaterally against the threaded bolt, entering the thread and damaging the thread as tightening continues. In the second stage of tightening, in which the two rolled-in portions are bent outwards and thereby lifted off the threaded bolt, this last-described effect can no longer take place, so that there would be a risk of the thread being damaged by bearing hard and unilaterally against the bores in the clamping ring flanges. In order to avoid this, the bores in the flanges are provided with the abovementioned beaded portions which are directed inwardly and therefore towards one another; these portions are formed as annular flanges and therefore have a relatively long guiding surface bearing against several turns of the thread of the clamping bolt, whereby damage to the threaded bolt by hard unilateral pressure contact between the bolt and the wall of the bore is avoided. This is connected with the fact that the specific surface pressure between the threaded bolt and the beaded portion is relatively small, because the contact pressure force is distributed over several turns of the thread. On the other hand, the contact and force relationships which arise, during tightening because of the beaded portions in combination with the two rolled-in portions, are such that the contact pressure forces are favourable even if there is unilateral contact between the bolt and the insides of the bores of the flanges, so that this in itself is sufficient to prevent damage to the clamping bolt.

It may be advantageous to make the clearance of the threaded bolt in the bores in the flanges greater in the direction towards the centre of the clamping ring than in the direction at right angles thereto and parallel to the axis of the clamping ring. For this reason, the bores in the flanges are formed as elongated holes of which the length extends towards the centre of the clamping ring band. This formation of elongated holes in the flanges has the advantage of more reliably ensuring that in the first stage of the tightening of the clamping bolt the rolled-in portions bear against the bolt and the thread of the clamping bolt does not engage the edges of the bores in the flanges. This formation of the bores or elongated holes is retained even when beaded portions are provided on the elongated holes.

FIGURE 1 shows a part of a clamping band at the point where the clamping screw is located, with both end portions of the clamping band rolled inwards, in the first stage of tightening in which the rolled-in portions bear on the threaded bolt, FIGURE 2 shows the part of the clamping band illustrated in FIGURE 1, in the second stage of tightening in which the two rolled-in portions are pressed against one another and thereby pressed outwards, and FIGURE 3 shows a cross-section through the clamping band at the point where the clamping screw is located, on the line VI—VI of FIGURE 1, In the embodiment shown in FIGURES 1 to 3, the two ends 21 and 22 of the clamping rings are bent away to form flanges 23 and 24. The angle 25 between the clamping band and each bent-away flange is slightly greater than 90° in the unstressed state. The flanges are provided with prolongations 26 and 27 which are rolled over inwards. Bores 28 and 29 are provided in the flanges 23 and 24, and the material of the flanges in the edge region of these bores is deformed so as to produce beaded portions 30 and 31 in the form of cylindrical flanges. A bridge member 32 is provided in the region of both flanges and lies under the ends 21 and 22 of the clamping band and is connected to the clamping band by spot welding at a point 33 on one end 22. A bolt 34 is slid through the bores 28 and 29 in the flanges of the clamping band; this bore carries a rectangular washer 35 previously placed thereon and bearing against the outer surface of one flange 23. A rectangular bolt nut 36 is screwed on to the screw bolt end projecting out of the bore 29 of the other flange 24.

When the clamping ring is tightened after having been placed round the flexible tube end or the like that is to be clamped, a tilting moment in the direction of the arrows 37 and 38 is exerted on the flanges 23 and 24. Since the rolled-in portions 26 and 27 bear against the top side of the clamping bolt 34 under the action of these tilting moments, this tilting moment cannot take effect but is absorbed by the clamping bolt. The arrangement of the beaded portions 30 and 31 and the dimensions of the rolled-in prolongations 26 and 27 is made such that in the first part of the process of tightening the clamping bolt the rolled-in portions 26 and 27 bear against the clamping bolt, and the bolt does not bear hard against the inner surface of the beaded portions 30 and 31.

After the two rolled-in portions 26 and 27 have come so close together, as the tightening process continues, that they are in contact with one another at the point 39, bending moments are exerted on the rolled-in portions whereby these rolled-in portions are bent away outwards about the upper edges 40 and 41 of the washer 35 and the bolt nut 36, in the direction of the two arrows 42 and 43, respectively. At the same time the rolled-in portions are thereby lifted off the screw bolt 34. By this process the bolt 34 is relieved of excessively great forces, and also the tilting moments produced by the tightening process are neutralised. One the other hand the beaded portions 30 and 31 ensure that no damage to the thread occurs if the screw bolt 34 bears unilaterally against the inside of the bores 28 and 29 of the flanges 23 and 24.

FIGURE 3 shows that if each bore 28 is formed as an elongated hole in its respective flange 23 it is thus possible to ensure, in an advantageous manner, that part 44 of the rolled-in portion 26 which projects furthest downwards extends beyond the upper portion 45 of the outline of the bore 28, so that this lower part 44 of the rolled-in portion 26 is certain to bear on the bolt 24 from above.

I claim:

1. A clamping ring of generally circular configuration including two adjacent ends disposed in generally parallel relation at right angles to the axis of said clamping ring, said adjacent ends each having portions thereof defining cylindrical flanges extending towards each other, each of said flanges having a bore therethrough about a common axis, a bolt extending through the bores and having a diameter substantially less than the diameter of the bores, rolled-in prolongations on said adjacent ends bent towards each other and disposed outwardly of the axis of said ring, and at least one of said rolled-in prolongations in enagagement against said bolt in a direction toward the axis of said ring.

2. A clamping ring as defined in claim 1, wherein said rolled-in prolongations engage said bolt during initial tightening of said clamping ring, said rolled-in prolongations movable into engagement with each other upon tightening of said clamping ring, said rolled-in portions disposed on the side of the bolt remote from the axis of said clamping ring and adapted to bear radially inwardly relative to said ring on the bolt.

References Cited in the file of this patent
UNITED STATES PATENTS

| | | |
|---|---|---|
| 1,172,690 | Erickson | Feb. 22, 1916 |
| 2,042,263 | Valley | May 26, 1936 |
| 2,365,017 | Sprouse | Dec. 12, 1944 |